Feb. 17, 1959 J. M. LEWIS Re. 24,601

METHOD OF PROCESSING PIPES

Original Filed Oct. 18, 1950 3 Sheets-Sheet 1

INVENTOR.
BY J. M. Lewis
C. M. McKnight
ATTORNEY

METHOD OF PROCESSING PIPES

Original Filed Oct. 18, 1950 3 Sheets-Sheet 2

INVENTOR.
BY J. M. Lewis
C. W. McKnight
ATTORNEY

METHOD OF PROCESSING PIPES

Original Filed Oct. 18, 1950 3 Sheets-Sheet 3

INVENTOR.
J. M. Lewis
BY
C. M. McKnight
ATTORNEY

United States Patent Office

Re. 24,601
Reissued Feb. 17, 1959

24,601

METHOD OF PROCESSING PIPES

Jesse M. Lewis, Tulsa, Okla., assignor to Williams Brothers Company, Tulsa, Okla., a corporation of Nevada Original No. 2,734,832, dated February 14, 1956, Serial No. 190,856, October 18, 1950. Application for reissue January 28, 1957, Serial No. 636,847

6 Claims. (Cl. 117—96)

Matter enclosed in heavy brackets [ ] appears in the original patent but forms no part of this reissue specification; matter printed in italics indicates the additions made by reissue.

This invention relates to a method of processing pipes, cylindrical objects and the like, and more particularly, but not by way of limitation, to a method and means for internally painting, or coating pipes.

It is well known that the service life of steel pipes, disposed underground, or otherwise, particularly when used to convey water or the like, is materially increased when the pipes are provided with a suitable coat of paint, bituminous or asphaltic material on the internal surface thereof. Heretofore, the seemingly best known method of internally coating a pipe involved the provision of a suitable trough, usually V-shaped in cross section, and filling the trough with the desired coating material. The trough was then supported in the maner of a cantilever and inserted in the joint pipe to be coated. The pipe was then rotated and simultaneously the trough was tilted to pour the coating material onto the inner surface of the pipe. The rotary motion imparted to the pipe obviously caused the coating material to spread over the inner surface of the pipe in a relatively even coat. It will be appreciated, however, that this method has numerous practical limitations, the most prominent of which is the lengths of pipe that can be coated in one operation.

The present invention contemplates a novel method of applying paint or any suitable coating material to the internal surface of a pipe for extending the service life thereof. It is contemplated to provide a horizontally disposed tubular boom over which one or more joints of pipe may be telescoped. The boom is provided with a suitable spray head on the outer end thereof supplied with coating material through the boom. While the spray head is dispensing the coating material, the pipe is moved rectilinearly off of the boom, and is simultaneously rotated in order that the coating material may be applied to the inner walls of the pipe in a helical path. Suitable machinery is provided to impart the desired movement to the pipe and to supply coating material to the boom.

This invention also contemplates a novel boom and spray head whereby the coating material may be applied to the pipe at the desired temperature to assure an even and uninterrupted coat on the pipe, and to prevent freezing of the coating material in the spray head or boom when not in use.

An important object of this invention is to provide a practical and efficient yet simple method of internally coating pipes.

Another object of this invention is to provide a method of internally coating pipes whereby the coating material is applied evenly in an uninterrupted path through the entire length of the pipe.

A further object of this invention is to provide a method of internally coating pipes whereby the coating material is applied at a predetermined temperature, and in a helical path to assure maximum protection for the pipe.

Another object of this invention is to provide a method of internally coating pipes whereby a plurality of interconnected pipe joints may be coated in one operation.

A still further object of this invention is to provide a novel spray head for applying coating material to the internal surface of a pipe.

Another object of this invention is to provide a novel spray head efficient in operation and economical to manufacture.

A further object of this invention is to provide a tubular boom adapted to supply coating material to a spray head in the pipe coating operation.

Other objects and advantages of the invention will be evident from the following detailed description, read in conjunction with the accompanying drawings, which illustrate my invention.

Figure 1:
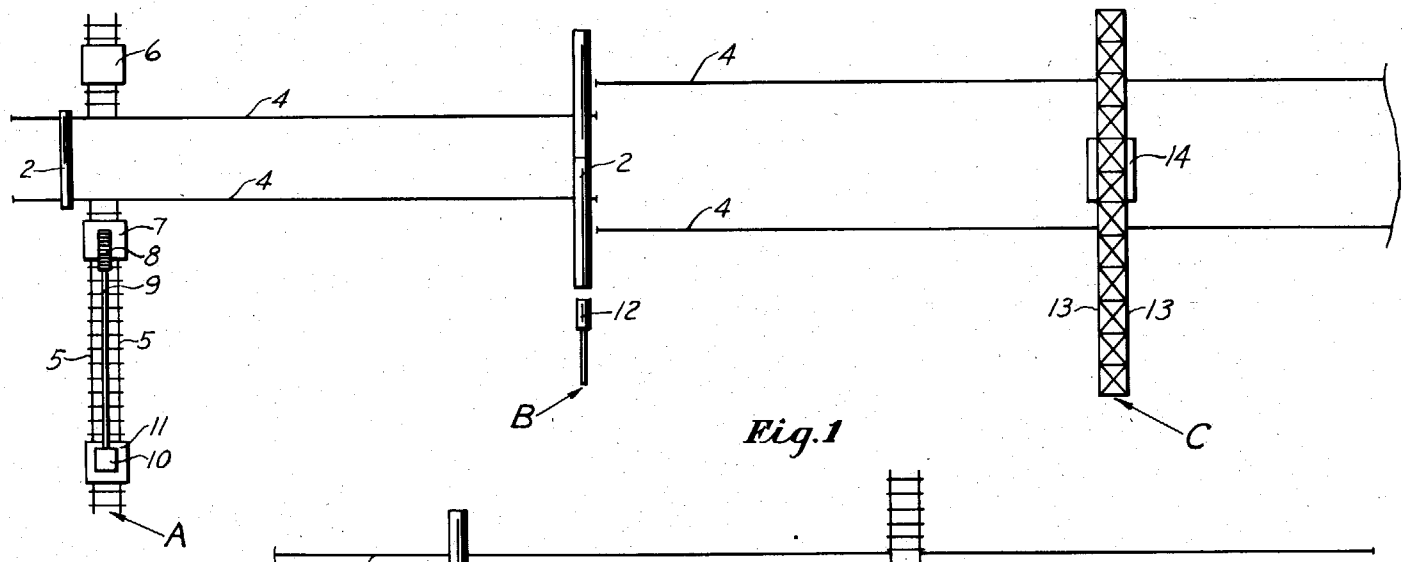
Figure 1 is a partial schematic layout showing various operation stations in a pipe processing yard.

Referring to the drawings in detail, and particularly Fig. 1, a joint or section of pipe 2 is placed transversely on a pair of suitable spaced pipe skids 4 (see left hand side of Fig. 1) preparatory to being processed as will be hereinafter set forth. It will be understood that the pipe processing plant is preferably located near the source of the supply of the pipe 2, and is usually located near the site where the pipe is to be strung, or used, to reduce the possibility of damaging the processed pipe during transportation.

The first step normally performed in the processing of a pipe is the internal cleaning thereof. In the processing yard shown schematically in Figs. 1 and 2, the joint of pipe 2 is rolled or moved along the pipe skids 4 to a cleaning station indicated generally at A. At station A, a pair of parallel tracks 5 are disposed transversely to the pipe skids 4. A pair of suitable nesting cars 6 and 7 are disposed on the tracks 5 on opposite sides of the pipe skids 4. The nesting cars 6 and 7 are adapted to move into abutting relationship (not shown) with the opposite ends of the pipe 2 to retain the pipe in a stationary position during the cleaning operation. The cleaning is accomplished by inserting into the pipe 2, a suitable cleaning head 8 having a plurality of brushes and knives (not shown) thereon, and rotating the head 8 through the medium of a drive shaft 9 and a suitable power unit 10. The power unit 10 is disposed on a car 11 adapted to move along the tracks 5 for moving the cleaning head 8 through the pipe 2.

After cleaning, the pipe 2 is moved in any suitable manner along the pipe skids 4 to a welding station indicated generally at B. An internal lineup clamp 12 is provided at station B to clamp and align either two or three joints of the pipe 2 (two being shown, but not limited thereto). When the joints of pipe 2 are clamped and aligned by the lineup clamp 12, a stringer bead is run on the joints. It will be noted that the pipe skids 4 are disposed further apart on the right hand side of station B to accommodate the double jointed pipe 2.

The pipe or welded sections of the pipe are then moved along the extended pipe skids 4 to another welding station indicated generally at C to complete the welding operation. A pair of suitable trusses 13 are provided at station C transversely to the pipe skids 4. The trusses 13 are of sufficient length to permit the movement of the double jointed pipe 2 thereunder. A suitable automatic welder 14 is suspended from the trusses 13 to efficiently complete the welding of the joints of pipe 2.

Figure 2:
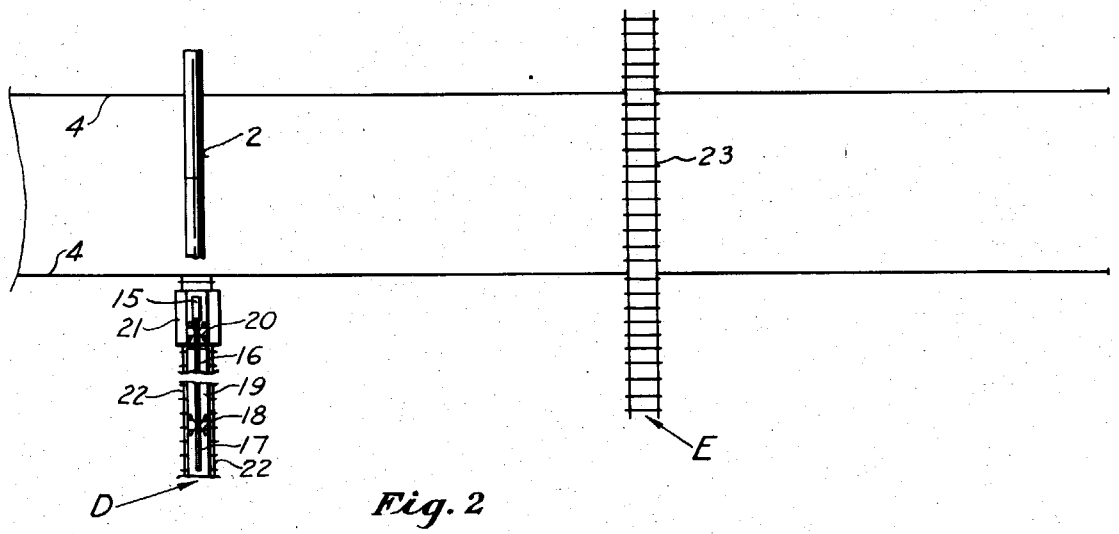
Figure 2 is an extension of the schematic layout shown in Figure 1 for the remainder of the pipe processing yard.

The cleaned and welded pipe 2 is then moved along the extended pipe skids 4 to a priming station indicated generally at D (Fig. 2). The priming is accomplished by moving annular spray head 15 through the pipe 2. The spray head 15 is provided on the end of an elongated handle 16 to permit the insertion and withdrawal of the spray head 15 from the pipe 2. The end 17 of the handle 16 is supported by a carriage 18 on a stationary runway 19 disposed transversely to the pipe skids 4. The handle 16 is also supported by a carriage 20 on a nesting car 21. The nesting car 21 is adapted to move along a pair of parallel tracks 22 disposed transversely to the pipe skids 4 and into abutting relation (not shown) with one end of the pipe 2. It will be apparent that when the spray head 15 is moved through the pipe 2, the carriage 20 will rest on the inner surface of the pipe 2 to support the spray head 15 in aligned relationship with the pipe. In applying a priming coat to the inner periphery of the pipe 2, the spray head 15 is first moved completely through the pipe 2. The priming material is turned on by suitable connections (not shown) and the spray head 15 ejects the priming material in a complete 360° arc. As the priming material is being ejected therefrom, the spray head 15 is removed from the pipe 2 to the position shown in Fig. 2. The pipe 2 is then again moved along the pipe skids 4 to an internal coating station indicated generally at E.

The skids 4 are interrupted at station "E" (Figs. 3 and 4) providing space for a pair of parallel rails 23 disposed transversely to the skids 4. A pair of nesting cars 24 and 25 are provided on the rails 23 and are adapted to move thereon while supporting the pipe 2. The rear car 25 is provided with a suitable engine (not shown) for driving the car along the rails 23. The engine on the car 25 is also adapted to drive a pair of transversely disposed rollers 26 supporting the rear end 27 of the pipe 2. The rollers 26 may be operated either independently of the movement of the car 25 or simultaneously therewith, and are adapted to rotate the pipe 2 as well as support the rear end 27 thereof. The front car 24 is provided with a pair of transversely disposed idler rollers 28 supporting the forward end 29 of the pipe 2 to permit free rotation of the pipe. It will be readily appreciated that the rear car 25 will tend to move out from under the pipe 2 when moving to the right (Figs. 3 and 4), and will tend to move along underneath the pipe 2 when moving in the opposite direction, because of the limited contact between the rollers 26 and the pipe. Therefore, the front and rear cars 24 and 25 may be interconnected, and suitable thrust rollers (not shown) are provided on each car in contact with the opposite ends of the pipe 2 to assure the simultaneous movement of the pipe with the cars.

Figure 4:
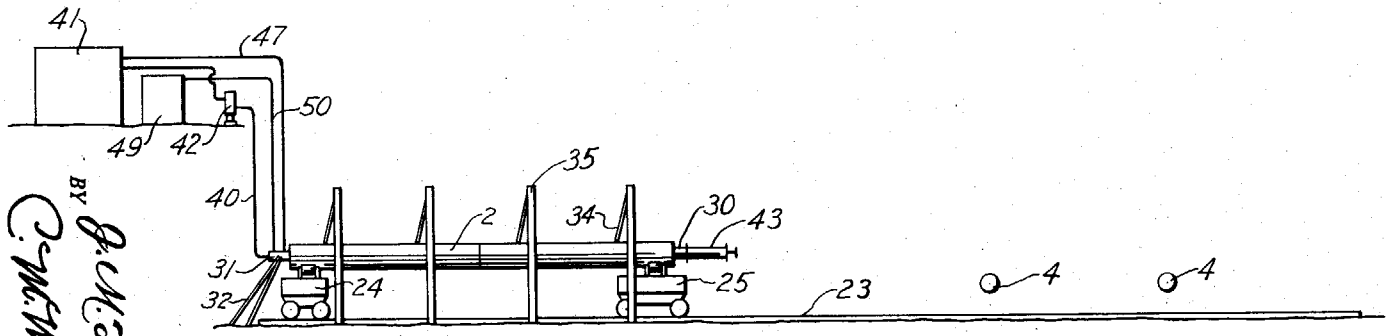
Figure 4 is a side elevational view of the apparatus shown in Figure 3, showing a pipe telescoped over the coating boom.

The rails 23 extend beneath and are in alignment with a horizontally disposed tubular boom 30. The boom 30 is supported at one end 31 by suitable braces 32. The boom is provided with a plurality of longitudinally spaced hooks 33 (Fig. 5) on the upper surface thereof adapted to be engaged by a plurality of hangers 34. Each hanger 34 is pivotally carried by an A-frame 35 arranged in multiples for supporting the boom 30. The hooks 33 open toward the end 31 of the boom 30 in order that when the pipe 2 is telescoped over the tubular boom 30, as will be hereinafter set forth, and the forward end 29 of the pipe 2 will strike the hangers 34 and disengage the hangers from the hooks 33. The hangers 34 will thereby be swung upwardly to permit the complete telescoping of the pipe 2 over the boom 30 as shown in Fig. 4. The boom 30 is also provided with a plurality of self-aligning rollers 36 (Fig. 5) on the lower surface thereof in spaced relation to the hooks 33. The rollers 36 contact the inner walls of the pipe 2 when the pipe is telescoped over the boom 30 to support the boom, and to align the boom 30 with the pipe 2.

Figure 6:
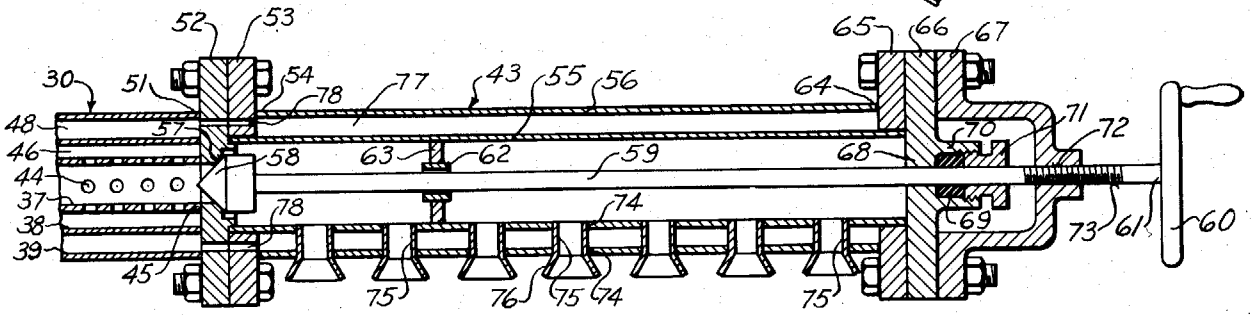
Figure 6 is a longitudinal sectional view of a novel spray head and a portion of the coating boom.

The boom 30 (Fig. 6) is composed of three concentrically disposed pipes or conduits 37, 38 and 39. The center pipe 37 provides a supply conduit or passageway for the coating material and is suitably interconnected by a conduit 40 (Figs. 3 and 4) with a coating material or dope supply pot shown schematically at 41. A suitable pump 42 is interposed in the conduit 40 to force the dope under pressure into the supply pipe 37.

As is well known, the coating material normally used on pipe lines is a bituminous or asphaltic material which solidifies at a relatively high temperature, therefore the dope pot 41 is of the usual type having heating means (not shown) therein for maintaining the dope at a predetermined temperature. When the dope is not being supplied to the spray head 43 (Figs. 4 and 6), as will be more fully hereinafter set forth, the dope is returned through a plurality of apertures 44 (Fig. 6) provided in the pipe 37 adjacent the end 45 thereof, and hence through the annulus 46 provided between the pipes 37 and 38. A conduit 47 (Figs. 3 and 4) interconnects the intermediate pipe 38 with the dope pot 41 to permit the return of the unused dope to the pot for reheating and reuse.

To maintain the dope for circulating in the boom 30 at a substantially constant temperature, steam is injected into the annulus 48 (Fig. 6) provided between the pipes 38 and 39. The steam is supplied by a suitable steam generator indicated schematically at 49 (Figs. 3 and 4) through a conduit 50 to the annulus 48. It is manifest that the steam supplied to the annulus 48 may be of sufficient temperature to prevent the freezing of the dope in the cylindrical boom 30.

The outermost end 51 (Fig. 6) of the tube 30 is provided with a blind flange 52 secured to a mating flange 53 in turn secured to one end 54 of the spray head 43. The spray head 43 is composed of preferably two concentric pipes 55 and 56 comparable in size to the pipes 38 and 39 of the boom 30. The flange 52 is provided with a suitable tapered valve seat 57 communicating with the pipe 37. A conical valve 58 cooperates with the valve seat 57 to alternately permit and preclude flow of the dope or coating material from the supply pipe 37 into the pipe 55 of the spray head 43 as will be more fully hereinafter set forth. The valve 58 is carried by a valve stem 59 extending longitudinally through the spray head 43 and having a suitable manipulating handle 60 on the outer end 61 thereof. The valve stem 59 and valve 58 are maintained in the correct operating position by a sleeve or bushing 62 secured by a cage 63 disposed in the pipe 55 in spaced relation to the end 54 of the spray head 43.

The outer end 64 of the spray head 43 is provided with a flange 65 secured to an end plate 66 and a bonnet 67. The end plate 66 is provided with an aperture 68 in the central portion thereof slidably receiving the valve stem 59. Suitable packing 69 is disposed around the shaft 59 in a boss 70 provided on the plate 66 concentric with the aperture 68. The packing 69 is retained in sealing position by a packing nut 71 threaded in the boss 70. The bonnet 67 is provided with a threaded aperture 72 in the central portion thereof to receive a threaded portion 73 of the shaft 59 adjacent the outer end 61 thereof.

It is readily seen that upon rotation of the handle 60 in one direction, the threads 73 cooperating with the threaded aperture 72 will cause movement of the shaft 59 and valve 58 away from the valve seat 57 and allow dope to flow from the supply pipe 37 into the pipe 55. Rotation of the handle 60 in the opposite direction will, of course, move the valve 58 onto the valve seat 57 to preclude the flow of the dope into the pipe 55. The sleeve 62 maintains the valve 58 concentric with the valve seat 57 to assure efficient closing of the valve.

It will be obvious to those skilled in the art, that the valve stem 59 and valve 58 may be actuated by means other than the handle 60, such as a pneumatic cylinder and plunger arrangement (not shown) for example. The present invention is therefore not limited to the specific means shown.

The pipes 55 and 56 of the spray head 43 are provided with a plurality of aligned apertures 74 along the lower surfaces thereof. The apertures 74 are disposed in spaced relation, and are arranged over essentially the entire length of the spray head 43. A nozzle 75 is secured in each pair of apertures 74 to provide outlets for the dope from the inner pipe 55. Each nozzle 75 is flared at its outer end 76 to disperse the dope flowing therethrough, thereby assuring an uninterrupted application of the dope from one end of the spray head 43 to the opposite end thereof. It will be apparent that the nozzles 75 may be straight instead of flared if desired, and disposed in closer relationship to provide complete coverage over the entire length of the head 43. The nozzles 75 are arranged along the lower surface of the spray head 43 to obtain a complete drainage of the dope from the head when the valve 58 is closed as above set forth, thereby assuring efficient operation of the head 43 upon a subsequent opening of the valve 58. The steam injected into the annulus 48 of the boom 30 is transferred into the annulus 77, provided between the pipes 55 and 56 of the spray head 43, through a plurality of aligned and circumferentially spaced apertures 78 provided in the flanges 52 and 53. The steam present in the annulus 77 will obviously tend to maintain the dope flowing through the pipe 55 and nozzles 75 at the desired temperature. To provide a drain for the steam from the boom 30 and spray head 43, the boom 30 is disposed at a slight angle from the horizontal. As the steam condenses, it flows by gravity to the lower end 31 (Fig. 3) of boom 30 and through a suitable drain line (not shown) back to the steam generator 49. It will be noted that the apertures 78 (Fig. 6) are in proximity with the inner surface of the pipe 56, therefore very little if any condensate will accumulate in the annulus 77 of the spray head 43.

OPERATION

Figure 3:
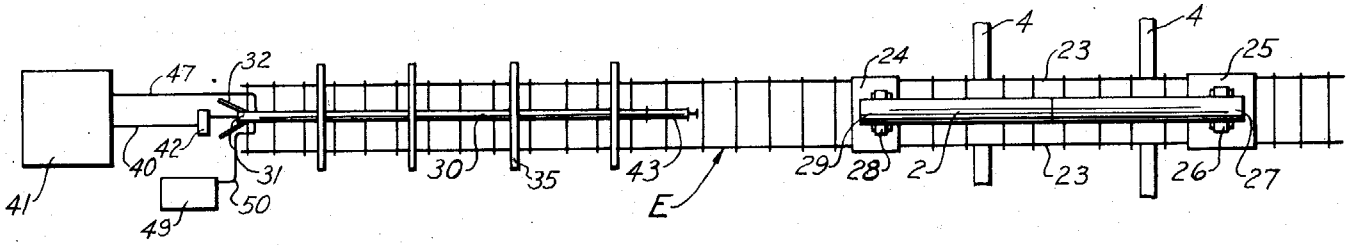
Figure 3 is a schematic plan view of the necessary apparatus for internally coating a pipe and illustrating a pipe removed from the coating boom.

After the pipe 2 has been rolled or moved down the skids 4 to station E as previously set forth, the pipe 2 is loaded onto the nesting cars 24 and 25 with the end 27 of the pipe 2 on the rollers 26 and the end 29 thereof on the rollers 28 as shown in Fig. 3. The rails 23 may be set below the level of the skids 4 in order that the top of the cars 24 and 25 will be even with the top of the skids 4 to facilitate the loading of the pipe 2 on the cars. The engine (not shown) on the car 25 is then started to move the cars 24 and 25 and the pipe 2 toward the boom 30. As the pipe 2 telescopes over the boom 30, the end 29 of the pipe 2 will knock the hangers 34 (Fig. 5) upwardly out of the path of the pipe as previously set forth, and the self-aligning wheels 36 will roll along the lower inner surface of the pipe 2 to support the boom 30 therein. The pipe 2 is moved over the boom 30 to the position shown in Fig. 4, permitting access to the spray head 43. It will be understood that the dope pump 42 has previously been placed in operation to circulate the hot dope through the boom 30.

Figure 5:
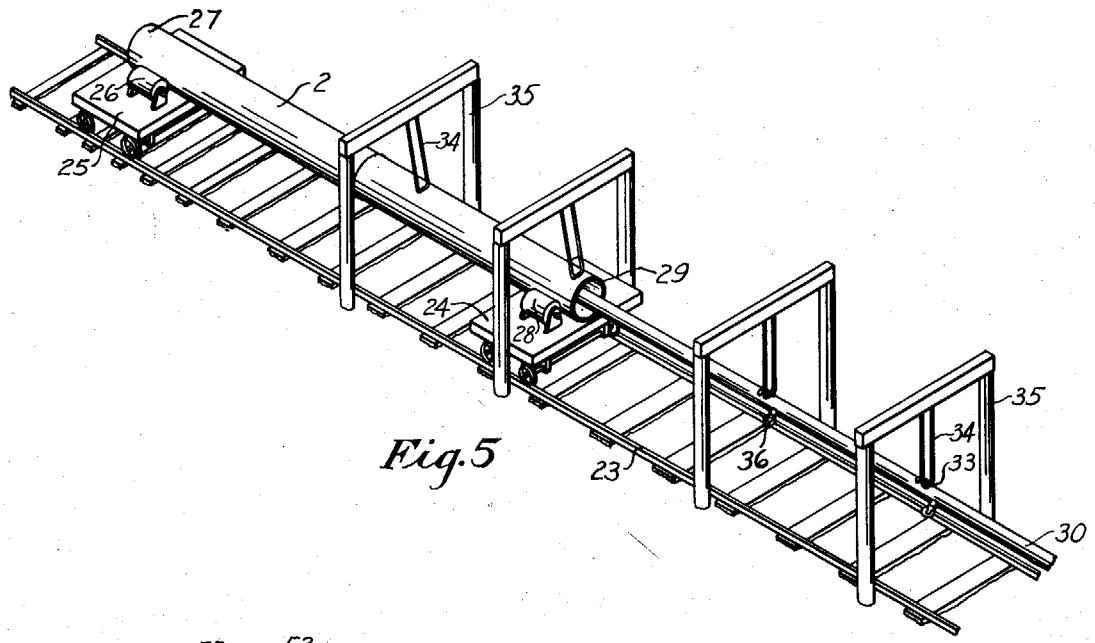
Figure 5 is a perspective view of part of the coating apparatus illustrating the movement of a pipe over the coating boom.

The valve 58 is then removed from the valve seat 57 through the medium of the valve stem 59 and handle 60 to start the flow of dope through the spray head 43. Essentially simultaneous with the opening of the valve 58, the pipe 2 is placed in rotation through the medium of the rollers 26 and the engine (not shown). When the pipe 2 has reached the desired rotational speed, and the flow of dope through the nozzles 75 of the spray head 43 has reached the desired velocity, the pipe 2 is started moving off of the boom 30 as illustrated in Fig. 5. The pipe 2 may, if desired, be placed in rotation simultaneously with the rectilinear movement thereof, depending upon the horsepower of the engine (not shown) disposed on the car 25. In actual practice however, it has been found desirable to start the rotation of the pipe 2 previous to moving the pipe rectilinearly, due to the limitations on the size of the engine which may be used. This invention is not limited to the time of placing the pipe 2 in rotation, however, since this feature merely depends upon the size of the engine (not shown) on the car 25.

As the pipe 2 is moved off of the boom 30 and simultaneously rotated, the spray head 43 will apply the dope in a helical path on the inner walls of the pipe throughout the length thereof. It will be readily appreciated that the rotational speed of the pipe 2 may be properly correlated with the rectilinear speed thereof to obtain a slight overlapping of the dope upon each turn of the pipe, thereby assuring a continuous coat of the dope on the pipe. The flared nozzles 75 will also tend to assure that no voids will appear in the coating material. As the dope is applied to the pipe 2, the dope will obviously be rotated simultaneous with the pipe, and the resulting centrifugal force will tend to spread the dope with an even and uniform coating without voids or air bubbles therein.

As previously stated, as the pipe 2 is moved off the boom 30, the hangers 34 will engage the hooks 33 to support the boom 30. After the pipe 2 has been moved completely off of the boom 30, the flow of dope through the spray head 43 is stopped by seating the valve 58 on the valve seat 57 as previously set forth. The dope will then merely by recirculated to the dope pot 41 until the spray head 43 is subsequently used.

After the pipe 2 is moved free of the boom 30 to the position shown in Fig. 3, the rotary motion of the pipe 2 is continued until the coating material has solidified thereon. In addition, air may be injected into one end of the pipe to speed up the drying of the coating material if desired. The pipe 2 is then removed from the nesting cars 24 and 25 onto the skids 4 to the right of station E as shown in Fig. 1.

The pipe 2 is then moved along the skids 4 to the ends thereof where the pipe is loaded onto trucks or the like (not shown) for transportation to the job.

From the foregoing, it is apparent that the present invention provides a practical and efficient method of internally coating a pipe wherein the pipe is telescoped onto a coating boom having a spray head on the outer end thereof; the pipe so disposed is placed in rotation and moved rectilinearly off of the boom while coating material is being ejected from the spray head in order to apply a layer of coating material in a helical path onto the inner surface of the pipe. The coating material is applied evenly and uninterruptedly throughout the length of the pipe at a predetermined temperature to obtain maximum protection for the pipe. The coating material is devoid of voids or bubbles and a coat of predetermined thickness is obtained.

It should also be apparent that the present invention provides a novel coating boom and spray head for maintaining the coating material at a predetermined and constant temperature at all times, whether the coating material is being used or merely recirculated. It is apparent the coating material will not solidify in the boom or spray head, and that the coating material will be ejected in a controlled path.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a method of internally coating [a pipe section of unusual length for flow of petroleum products] *multiple lengths of connected pipe for pipe lines for flow of*

*fluids* therethrough by use of a coating boom having a spray head on the outer end thereof and consisting of suspending the boom in an essentially horizontal position at a plurality of releasably longitudinally spaced supporting positions, telescoping the pipe over the spray head and boom, simultaneously releasing the suspended boom progressively as the pipe passes the spaced supporting positions during the telescoping operation, supplying the spray head with coating material through the boom, spraying the coating material onto the inner walls of the pipe while moving the pipe off of the boom, simultaneously rotating the pipe in timed relation with the rectilinear movement thereof to apply the coating material in a helical path, and continuing the rotation of the pipe after removal from the boom until the coating material solidifies thereon, *re-engaging the boom progressively at the plurality of spaced supporting positions for re-suspending the boom.*

2. In a method of internally coating [a pipe of unusual length for flow of petroleum products] *multiple lengths of connected pipe for pipe lines for flow of fluids* therethrough by use of a coating boom having a spray head on the outer end thereof consisting of suspending the boom in an essentially horizontal position through a plurality of releasably longitudinally spaced supports therefor, telescoping the pipe over the spray head and boom, simultaneously releasing the suspended boom progressively as the pipe passes a spaced support during the telescoping operation, supplying the spray head with coating material through the boom, spraying the coating material onto the inner walls of the pipe while moving the pipe off of the boom, simultaneously rotating the pipe in timed relation with the rectilinear movement thereof to apply the coating material in a helical path, continuing the rotation of the pipe after removal from the boom until the coating material solidifies thereon, and injecting air into the pipe to accelerate the solidification of the coating material, *re-engaging the boom progressively at the plurality of spaced supporting positions for re-suspending the boom.*

3. In a method of internally coating [a plurality of interconnected joints of pipe of unusual length for flow of petroleum products therethrough] *multiple lengths of connected pipe sections for pipe lines* consisting of telescoping the joints of pipe over a spray boom and supported at a [multiple] *plurality* of longitudinally spaced [points] *supports* for releasable suspension in a horizontal plane, disengaging the spray boom from its suspended state progressively during the telescoping operation, supplying coating material to the spray boom, ejecting coating material from the spray boom in an essentially longitudinal stream onto the inner surface of the pipe, moving the joints of pipe off of the boom, and simultaneously rotating the joints of pipe to apply the coating material in an overlapping helical path on the inner surface of the pipe, *re-engaging the boom progressively at the plurality of spaced supporting positions for re-suspending the boom.*

4. In a method of internally coating [a plurality of connected pipe sections of large diameter and proportionate length utilized for flow of petroleum products] *multiple lengths of connected pipe for pipe lines for flow of fluids* therethrough with a releasable suspended coating boom having a spray head on the outer end thereof consisting of telescoping the pipe over the boom, *progressively* releasing the boom *from a plurality of longitudinally spaced supports* for horizontally supporting the boom in the pipe, translating the pipe off the boom over the spray head and simultaneously rotating the pipe while the spray head is ejecting coating material [,] whereby the coating material is applied in a helical path on the inner surface of the pipe, *re-engaging the boom progressively at the plurality of spaced supporting positions for re-suspending the boom whereby the boom is maintained in operative position relative to the pipe.*

5. In a method of internally coating [a pipe of large diameter and of substantial length for flow of petroleum products therethrough] *multiple lengths of connected pipe sections for pipe lines* by use of a coating boom having a spray head on the outer end thereof, which consists of suspending the boom in an essentially horizontal position *through a plurality of releasably longitudinally spaced supports therefor,* telescoping the pipe over the spray head and the boom, *progressively* disengaging the boom from its suspended state during the telescoping movement of the pipe, supporting the disengaged boom in the pipe when in telescopic position, spraying the coating material onto the inner walls of the pipe while moving the pipe in a rectilinear path along the boom, and simultaneously rotating the pipe in timed relation with the rectilinear movement to supply the coating material in a helical path, *re-engaging the boom progressively at the plurality of spaced supporting positions for re-suspending the boom whereby the boom is maintained in operative position relative to the pipe.*

6. A method of internally coating [a pipe section of large diameter and proportionate length normally utilized for discharge of petroleum products] *multiple lengths of connected pipe for pipe lines for flow of fluids* therethrough by use of a horizontally suspended coating boom having a spray head on the outer end thereof, which consists of telescoping the pipe over the boom and spray head, successively releasing the boom at a plurality of longitudinal supporting positions during the telescoping movement thereover, supplying the spray head with coating material through the boom, spraying the coating material onto the inner walls of the pipe while moving the pipe continually off of the boom, and simultaneously rotating the pipe in timed relation with the rectilinear telescoping movement thereof to apply the coating material in a helical path, *re-engaging the boom successively at the plurality of spaced supporting positions for re-suspending the boom.*

References Cited in the file of this patent or the original patent

UNITED STATES PATENTS

| | | |
|---|---|---|
| 1,660,597 | Conkle et al. | Feb. 28, 1928 |
| 1,831,945 | Boynton | Nov. 17, 1931 |
| 1,913,757 | Hannon | June 13, 1933 |
| 1,936,247 | Hannon | Nov. 21, 1933 |
| 2,044,078 | Jones | June 16, 1936 |
| 2,074,935 | Potthoff | Mar. 23, 1937 |
| 2,348,714 | Defiore | May 16, 1944 |
| 2,366,150 | Yount | Dec. 26, 1944 |
| 2,411,250 | Evans | Nov. 19, 1946 |
| 2,470,796 | Stromquist | May 24, 1949 |

FOREIGN PATENTS

| | | |
|---|---|---|
| 496,499 | Great Britain | Dec. 1, 1938 |